United States Patent [19]

Stauffer

[11] Patent Number: 5,429,085
[45] Date of Patent: Jul. 4, 1995

[54] TIMING MECHANISM FOR ROTARY ENGINES

[76] Inventor: John E. Stauffer, 6 Pecksland Rd., Greenwich, Conn. 06831

[21] Appl. No.: 152,240

[22] Filed: Nov. 16, 1993

[51] Int. Cl.⁶ .................. F02B 53/00; F01C 1/063
[52] U.S. Cl. ............................ 123/245; 418/35
[58] Field of Search ............ 123/245; 418/33–36

[56] References Cited

U.S. PATENT DOCUMENTS

| | | | |
|---|---|---|---|
| 951,197 | 3/1910 | O'Connor | 418/36 |
| 1,224,642 | 5/1917 | Holmes | 418/35 |
| 1,353,374 | 9/1920 | Arrighi | 418/33 |
| 1,962,408 | 6/1934 | Powell | 418/36 |
| 2,088,779 | 8/1937 | English | 418/35 |
| 2,302,254 | 11/1942 | Rhine | 123/213 |
| 3,294,071 | 12/1966 | Turco | 418/35 |
| 3,329,132 | 7/1967 | Castelet | 123/213 |
| 3,418,986 | 12/1968 | Scherenberg | 123/559.1 |
| 4,281,628 | 8/1981 | Doundoulakis | 123/245 |
| 4,319,551 | 3/1982 | Rubinshtein | 418/35 |
| 4,390,327 | 6/1983 | Picavet | 418/35 |
| 4,744,736 | 5/1988 | Stauffer | 418/35 |
| 4,890,591 | 1/1990 | Stauffer | 418/35 |

FOREIGN PATENT DOCUMENTS 920601 1/1947 France .

*Primary Examiner*—Michael Koczo
*Attorney, Agent, or Firm*—Young, MacFarlane & Wood

[57] ABSTRACT

A rotary internal combustion engine including a housing and two vanes mounted on concentric shafts for independent rotation in one direction within the housing in response to combustion within the housing. The engine further includes a ratchet assembly, including a ratchet housing associated with the concentric shafts to prevent rotation of the vanes within the housing in the opposite direction, and a converter assembly operative to convert the movement of the vanes into unidirectional rotation of an output shaft. In order to ensure steady state operation and provide control over the combustion ratio of the engine, a timing mechanism is provided to sense the relative position of the vanes at any given point in the engine cycle and rotate the vanes relative to the housing independently of the combustion induced rotation of the vanes within the housing. The independent relative rotation of the vanes is accomplished by rotating the housing of the ratchet assembly in accordance with the sensed relative position of the vanes within the housing.

9 Claims, 4 Drawing Sheets

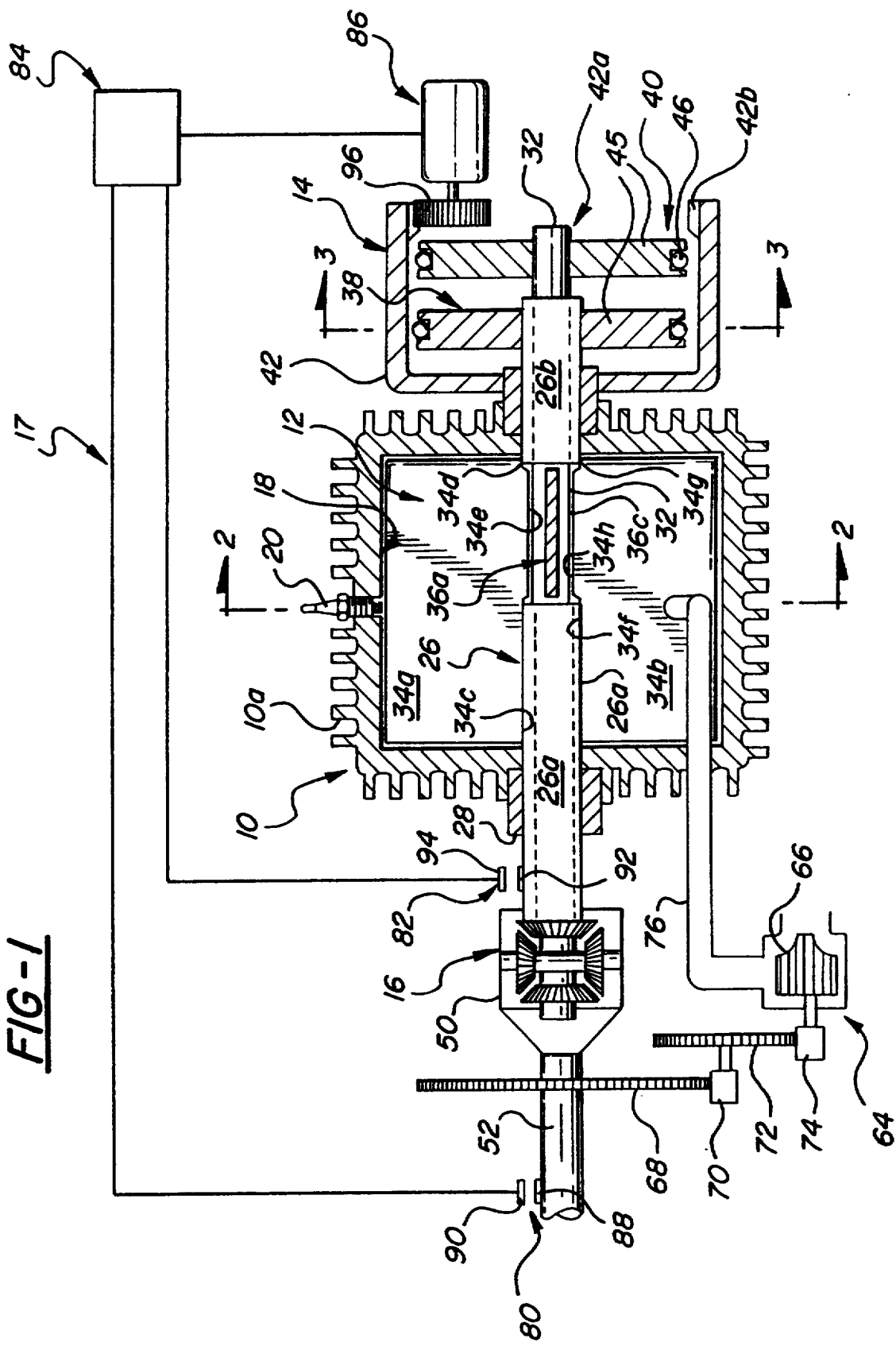

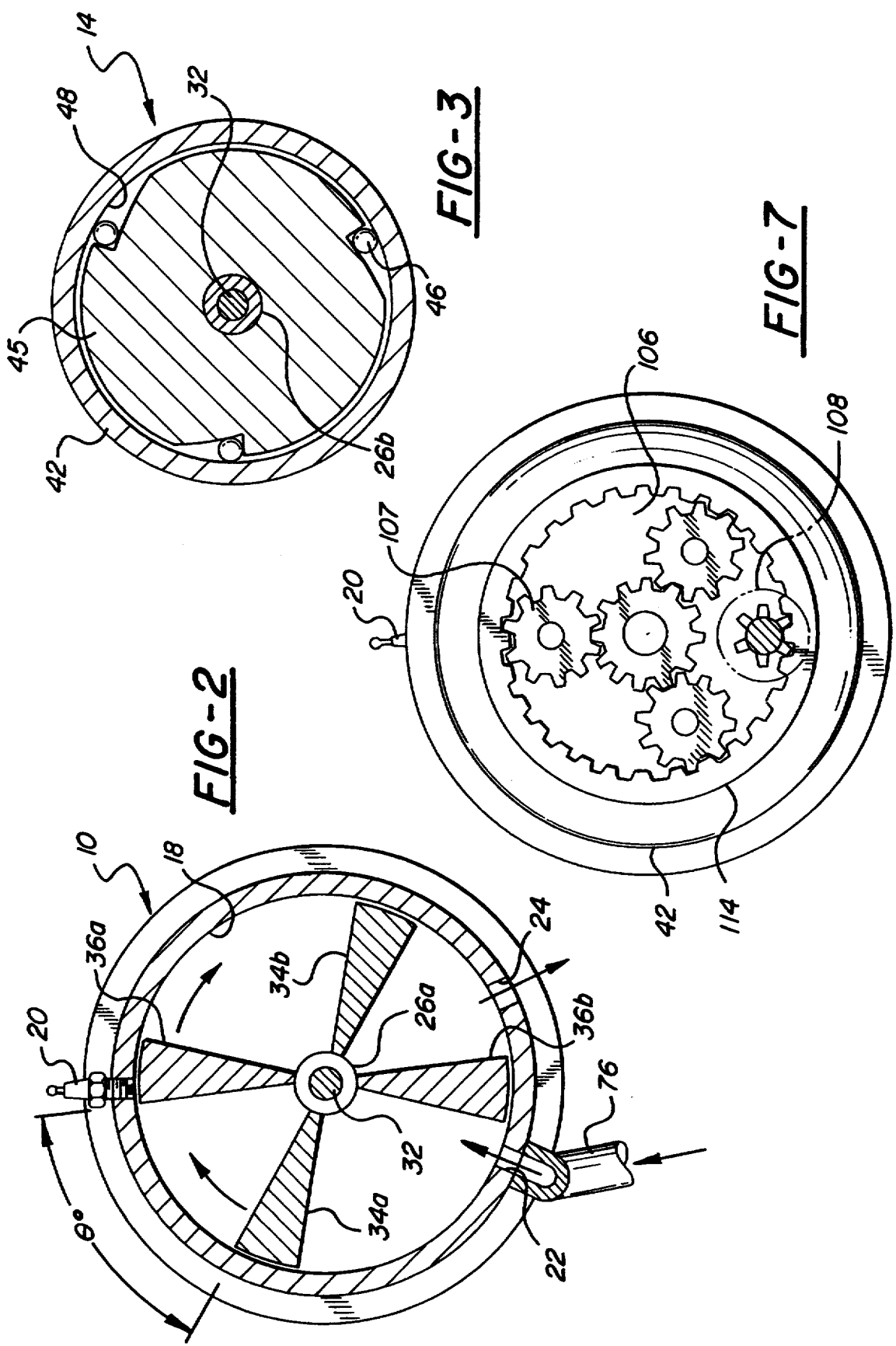

5,429,085

TIMING MECHANISM FOR ROTARY ENGINES

TECHNICAL FIELD

This invention relates to a timing mechanism for rotary internal combustion engines of the type including two freely rotating vanes or pistons which rotate within a housing in such a manner that allows the vanes alternately to approach and move away from each other thereby defining intake, compression, expansion and exhaust strokes.

BACKGROUND OF THE INVENTION

A rotary engine of this type is disclosed in U.S. Pat. No. 4,890,591. This patent describes the principal components of such an engine including the housing, vanes, concentric shafts to which the vanes are attached, control means to restrict rotation of the vanes to one direction, converter means to convert the somewhat promiscuous motions of the vanes into unidirectional rotation of an output shaft, and means to start the engine. A key feature of the engine is the uninhibited movement of its vanes as they undergo relative rotation.

Whereas the engine of this patent provides many constructional and operational advantages as compared to prior art engines of this type, it fails to fully take into account the importance of the momentum of the vanes with the result that the engine may fail to give reproducible results from one cycle to the next.

Therefore, an object of the present invention is to correct the deficiencies of existing rotary engine designs by providing means to ensure steady state operation under optimum or ideal working conditions.

A further object of the present invention is to provide control over the compression ratio and to be able to adjust it within certain limitations.

These and other objects, features and advantages of the present invention will be apparent from the accompanying drawings and the following description.

SUMMARY OF THE INVENTION

According to the present invention, independent means of rotation are provided in order to rotate the vanes relative to the engine housing in which the sparkplug, inlet and exit ports are located. Vane rotation is controlled so that steady state operation of the engine is assured. Under steady state operation the compression ratio will remain unchanged; intake, compression, expansion and exhaust strokes will be fixed; and all other parameters will remain constant.

The means of vane rotation, in one configuration, comprises an electric motor which rotates the housing of an associated ratchet assembly. The ratchet assembly serves as a control means to restrict rotation of the vanes to one direction. The net effect of such rotation is to control the average rotational velocity of the vanes.

The motor which rotates the ratchet housing is regulated by a processor or computer. The processor receives a signal from a sensor which measures the separation of the vanes at a given point in the engine cycle. For example, the distance between the vanes can be determined at the time of ignition, and this result is then used to adjust the motor speed accordingly.

Taken together, the above elements, namely, sensor, processor and motor, constitute a timing mechanism such that the harmonic motion of the vanes, which alternately approach and recede from each other, is synchronized with their average rotational velocity. By this means, for example, the separation of the vanes at the point of ignition can be held constant from one cycle to the next. In addition, the inlet and exhaust ports will be uncovered or blocked as needed to achieve the desired intake, compression, expansion and exhaust strokes.

BRIEF DESCRIPTION OF THE DRAWINGS

FIG. 1 is a longitudinal cross-sectional view of the engine including a schematic diagram of the timing mechanism;

FIGS. 2 and 3 are transverse cross-sectional views taken respectively on lines 2—2 and 3—3 of FIG. 1;

FIG. 7 is a view looking in the direction of the arrow 7 in FIG. 6.

DETAILED DESCRIPTION OF THE PREFERRED EMBODIMENTS

Figure 5:
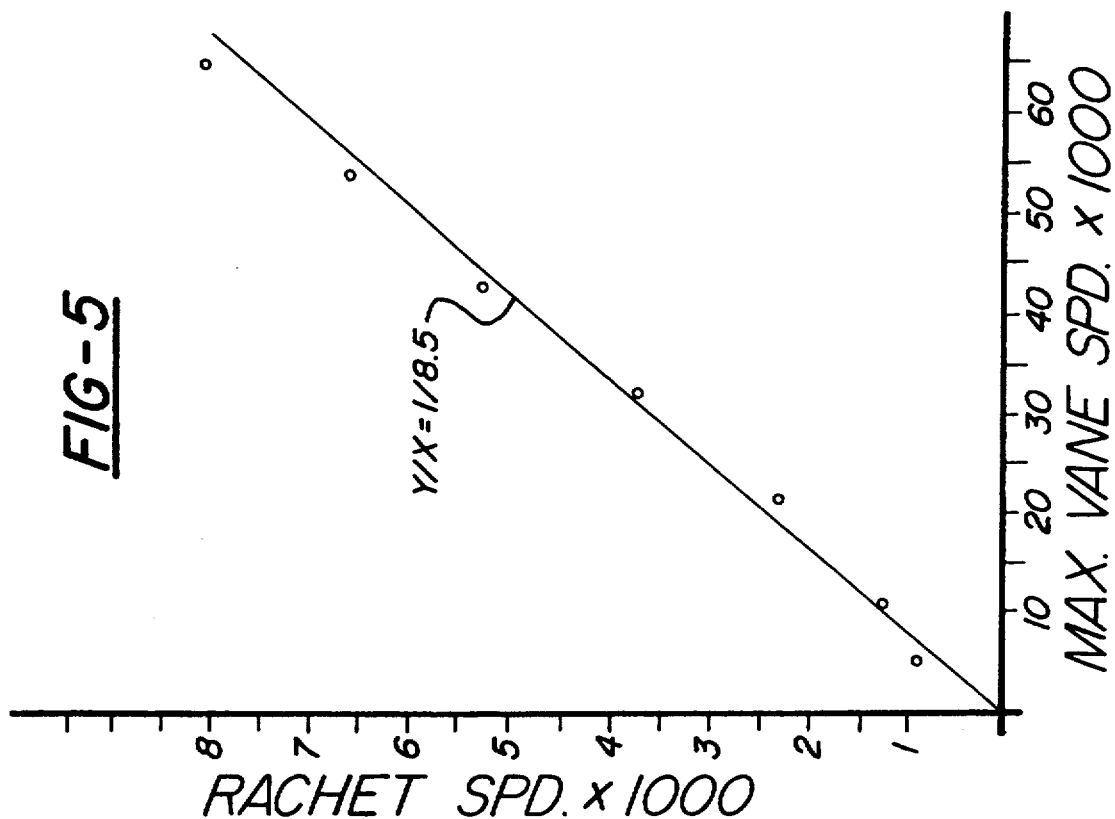
FIG. 5 is a plot of the ratchet housing speed versus maximum vane speed under steady state conditions.

The rotary internal combustion engine seen schematically and in longitudinal cross section in FIG. 1, broadly considered, includes a housing 10; a rotary piston assembly 12; a ratchet assembly 14; a converter mechanism 16; and a timing mechanism 17.

Housing 10 is cylindrical and defines a combustion chamber 18. A spark plug or glow plug 20 is provided at a top dead center location in the housing and communicates with combustion chamber 18. Intake and exhaust ports 22 and 24, shown in FIG. 2, are provided adjacent the lower end of the housing generally opposite plug 20. Fins 10a are provided for cooling the housing.

Rotary piston assembly 12 is positioned within housing 10 and includes a first shaft or hub 26 including axially spaced separate portions 26a and 26b; a pair of bearings 28 and 30 positioned in opposite side walls of housing 10 and respectively journalling shaft portions 26a and 26b; a shaft or hub 32 concentric with shaft 26 and journalled within shaft 26; a first rotary vane or piston 34 secured to shaft portions 26a and 26b; and a second vane or piston 36 secured to shaft 32.

Vane 34 includes first and second portions 34a and 34b. Portion 34a is secured to shaft portion 26a along inner vane 34c and is secured to shaft portion 26b at 34d with an intermediate inner vane edge portion 34e closely but slidably interfacing with shaft 32. Vane portion 34b is secured to shaft portion 26a along inner vane edge 34f and is secured to shaft portion 26b at 34g with an intermediate vane edge portion 34h closely but slidably interfacing with shaft 32.

Vane 36 includes first and second portions 36a and 36b. Vane portion 36a is secured to shaft 32 along inner vane edge 36c and closely but slidably interfaces with shaft portion 26a and 26b. Vane portion 36b, shown in FIG. 2, is positioned diametrically opposite from vane portion 36a, and it is similarly secured to shaft 32 and closely but slidably interfaces with shaft portions 26a and 26b.

Vanes or pistons 34 and 36 are configured to fit as tightly as possible within the combustion chamber without actually touching the walls of the chamber as they rotate relative to the chamber. If desired, an internal lubricant or oil may be used to protect the edges of the pistons and the adjacent walls of the chamber although, with proper control of the fit between the pistons and the walls of the combustion chamber, an internal lubricant may not be necessary. As seen, the pistons have a generally wedge-shaped configuration so that, as the pistons approach each other during their relative rotation, their faces move into a parallel relationship to avoid contact.

Ratchet assembly 14 includes a pair of ratchet mechanisms 38 and 40 respectively associated with each of the concentric shafts 26 and 32. The ratchet mechanisms are disposed side-by-side in axially spaced relation within a circular housing 42. Housing 42 has an open end 42a and includes an internal gear 42b adjacent open end 42a. Housing 42 is journalled for rotation about bearing 30.

Each ratchet mechanism includes a circular ratchet body 45 secured to the respective shaft and a plurality of balls 46 respectively ensconced in a plurality of circumferentially spaced pockets 48 provided on the periphery of the ratchet body. Ratchet body 45 and balls 46 coact in known manner with the housing 42 to preclude counterclockwise rotation of the respective shaft and vane as viewed in FIG. 2 while allowing the free clockwise rotation.

Converter mechanism 16, as seen in FIG. 1, is a standard differential gear assembly. It comprises four pinion bevel gears, a housing 50, and output shaft 52 fixedly and centrally secured to housing 50. The concentric shafts 26 and 32 are coupled to two of the pinion gears which coact in known manner in the gear assembly to rotate the output shaft in a unidirectional, constant speed mode.

The engine further includes a supercharger 64 including a blower 66 drivingly connected to output shaft 52 by reduction gears 68, 70, 72 and 74. A suitable conduit 76 interconnects the output of the supercharger with the intake port 22 of housing 10.

Timing mechanism 17 includes sensors 80 and 82, a microprocessor or motor control 84, and a motor 86.

Sensor 80, located on output shaft 52, comprises a cam 88, rotating with output shaft 52, and an electrical breaker point 90 actuated by cam 88 in response to rotation of shaft 52.

Sensor 82 is of similar design and is located on portion 26a of concentric shaft 26 and includes a cam 92 rotating with shaft portion 26a and an electrical breaker point 94 actuated by cam 92 in response to rotation of shaft portion 26a.

Cam 92 is positioned to indicate when vane portion 34a passes sparkplug 20 and cam 88 is attached to output shaft 52 such that it is spaced equidistant between vane portions 34a and 36a. Microprocessor 84 receives the electrical output signals from sensors 80 and 82 and modulates the power supply to motor 86. Motor 86 is drivingly connected to ratchet housing 42 through a pinion gear 96 meshing with internal ring gear 42b on ratchet housing 42.

Engine Operation

The operation of the engine has been simulated using a desk-top digital computer. In this application, an Apple Macintosh Plus computer with a PL52 Turbo hard disk drive was used. Software consisted of the spreadsheet from Microsoft Works, Version 2.0. In programming the engine operation a separate column was used to enter a given parameter such as the volume of the compressed gas. Each row of the spreadsheet indicated the data for a different point in the engine cycle. By reducing the time increments between successive points and thereby increasing the total number of rows, any desired degree of accuracy could be obtained. The only limitation was the memory capacity of the computer.

In the computer analysis of the operation, an air-standard cycle was assumed. In this idealized cycle, air alone is the working fluid, and although its results are not perfect it is recognized as providing a good approximation of engine working conditions. The engine is based on the four basic strokes of the Otto engine, namely, intake, compression, expansion and exhaust. The intake and exhaust strokes occur at constant pressure (atmospheric pressure is assumed) and changing volume. Both compression and expansion strokes are taken as isentropic, or in other words, reversible, adiabatic. Ignition occurs at constant volume.

Because the compression and expansion strokes are reversible, adiabatic, the vanes, as they approach each other, will interact as if they were perfectly elastic bodies. The total kinetic energy of the vanes after collision is the same as before since no energy is converted to heat. Although the vanes, which are of equal mass, will not actually touch, the momentum of one vane will be transferred to the other.

Now consider an engine cycle by referring to FIG. 2. At the beginning of the cycle the leading edge of vane portion 34a is at 0° and the trailing edge of vane portion 36a is at $\theta$°. The beginning of the cycle is defined as that point when the pressure of the gas between vane portions 34a and 36a equals the pressure of the gas between vane portions 36a and 34b. This point can be determined quite easily, and it is a logical place to begin the cycle since at this point vane portion 34a begins its deceleration and vane portion 36a starts to accelerate.

Both pistons rotate in a clockwise direction in this analysis. Their minimum speed of rotation is determined by the velocity of the ratchet housing. Ignition of the charge between vane portions 34a and 36a occurs after vane portion 36a passes the sparkplug. Although the pressure of the gas between vane portions 34a and 36a immediately surges after ignition the two vane portions continue to approach each other until the momentum of the faster moving vane has been completely transferred to the slower one. At this point the expansion stroke commences as the combustion gases between vane portions 34a and 36a drive the vanes apart. Once vane portion 36a uncovers exhaust port 24 the expanded gases can escape and are swept out of the chamber during the exhaust stroke.

While the gases were being compressed between vane portions 34a and 36a, a fresh charge was being introduced between vane portions 34a and 36b during the intake stroke for the next cycle. As soon as vane portion 36b blocks the intake port 22 this fresh charge undergoes compression. A new cycle begins as soon as the pressure between vane portions 34a and 36b rises to equal the pressure between vane portions 34a and 36a. When the engine is operating at steady state this point should be at 0° or the exact same location as the start of the previous cycle.

So far nothing has been said about the speed of the ratchet housing. This speed can be calculated for the limiting case in which the vanes practically touch each other as they collide. In this operational mode they react very much like billiard balls. The inertia of the vanes is sufficiently large so that the faster moving vane all but hits the slower vane before the latter has a chance to accelerate. This special case has practical significance because real engines are fabricated from dense materials and must operate at high speeds in order to provide the expected performance.

In this limiting case one vane rotates constantly at its maximum speed while the slower moving vane rotates at the speed of the ratchet housing. If the size of the vanes is assumed to be equal to an arc of 20° then the faster moving vane must travel 160° while the slower one moves 20° Thus, the speed of the ratchet housing in this limiting case must equal ⅛ the speed of the maximum vane speed. As conditions deviate from the limiting case, the relative speed of the ratchet housing will decrease.

Another way of looking at the velocities of the vanes is to resolve their motions into two components. One component is the rotational movement equal to their average speed. The other component is a harmonic motion defined as the oscillatory motion of the vanes about a position of equilibrium. For the engine to operate under steady state conditions, this harmonic motion must be synchronized with the rotational movement of the vanes.

As noted above, the speed of the ratchet housing under steady state conditions will deviate from the limiting case. Furthermore, the ratchet housing speed can be expected to vary depending on the operating conditions of the engine. For these reasons, some means of control must be provided in order to regulate the speed of the ratchet housing.

Such control means is provided by sensors 80 and 82 which detect the positions of the vanes at some given point in the engine cycle. Specifically, cam 92, attached to shaft portion 26a, triggers electrical breaker point 94 to generate a first signal which indicates when vane portion 34a passes the sparkplug. Cam 88, as previously indicated, is attached to output shaft 52 such that it is spaced equidistant between vane portions 34a and 36. When cam 88 passes the location of the sparkplug, electrical breaker point 90 is triggered to generate a second signal. The time difference between the two breaker point signals will indicate the spacing of the vanes at the point of ignition.

If the vanes are excessively far apart at the time of ignition, the ratchet housing speed can be reduced. Conversely, if the vanes are too close at ignition, the ratchet housing speed can be increased. In this manner control can be maintained over the compression ratio. Furthermore, steady state conditions will be achieved such that the ports will be uncovered and blocked as required.

The output signals from the sensors are used by a microprocessor 84 to control the power to motor 86 and thus regulate its speed. The advent of solid state microprocessors is fortuitous for this application. Fabricated from silicon chips, the microprocessors are compact, rugged and reliable. Their fast response time is suited to the need of providing instantaneous control over the engine operation.

The means of rotation of the ratchet housing 42, as shown in FIG. 1, comprises electric motor 86 drivingly connected to housing 42 through pinion gear 96 and internal ring gear 42b. Motor 86 can be used during the starting of the engine. Once the engine is started however the motor is not disengaged from the ratchet housing.

Figure 6:
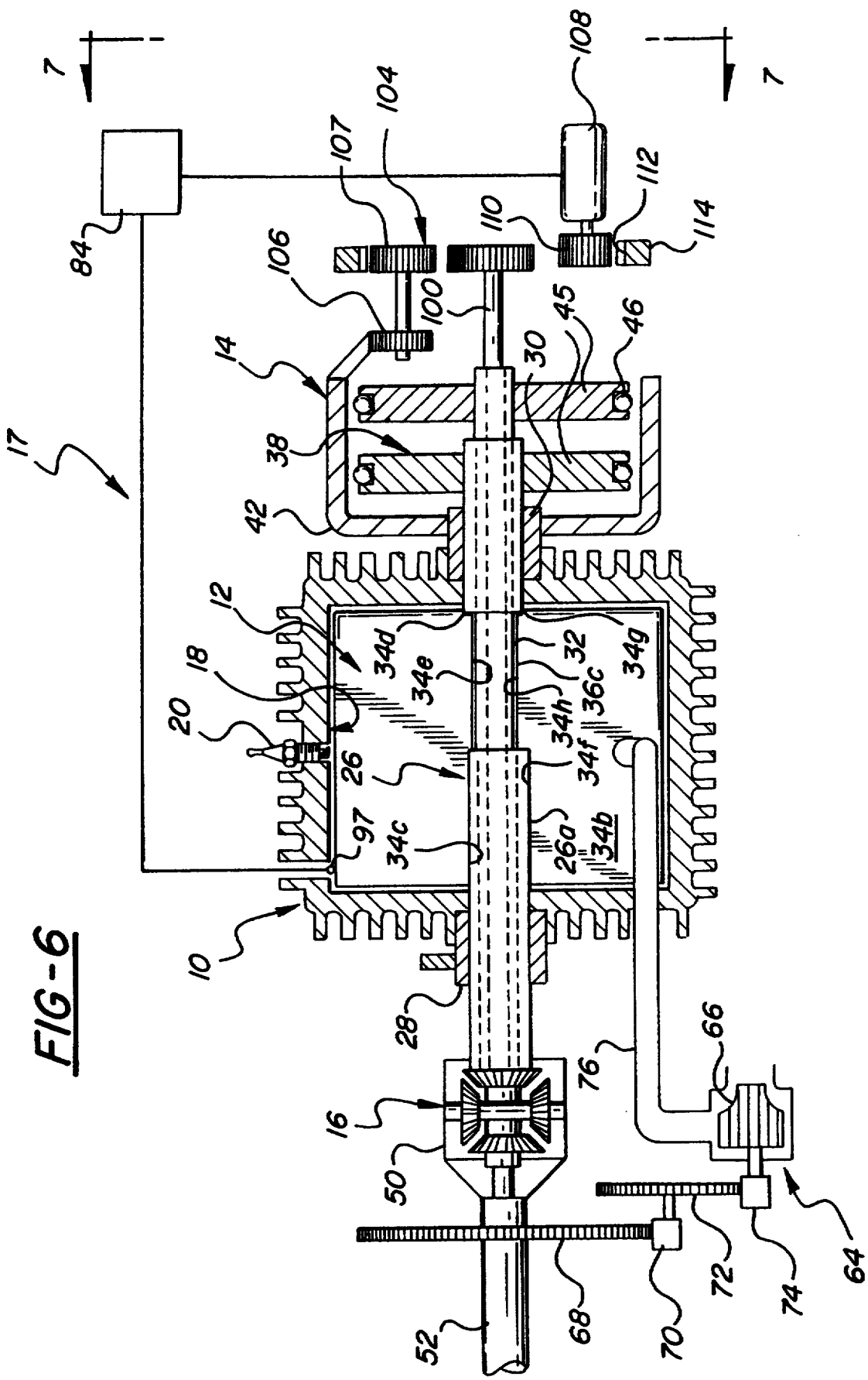
FIG. 6 is a longitudinal cross-sectional view of an alternate embodiment of the engine.

Alternative means of rotation of the ratchet housing are possible. The ratchet housing speed at steady state operation has been shown to be roughly proportional to the maximum speed of the vanes and therefore it is also approximately proportional to the speed of the engine itself. Thus, the output shaft can be used to drive the ratchet housing. In such a configuration, as seen in FIGS. 6 and 7, a shaft 100 located on the axis of the engine is connected at one end to output shaft 52 and at the other end to the sun gear 102 of an epicyclic or planetary gear train 104. In this application, concentric shaft 32 must be hollow so that shaft 100 can rotate freely within it. The carrier 106 for the planetary gear train is connected to the ratchet housing 42. Fine control is provided by a motor 108 driving a pinion gear 110 meshing with internal gear teeth 112 on planetary ring gear 114. Thus, the motor, which provides vernier control, requires relatively little power and need not be of excessive capacity.

An alternate sensor arrangement is also shown in FIG. 6. In the sensor arrangement of FIG. 6 the two cam/breaker point sensors 80, 82 are replaced with a single pressure transducer 97 positioned in housing 42 in a position where it is exposed to the gas pressure in combustion chamber 18. The instantaneous pressure of the compressed gas between the two vanes, as sensed by transducer 97 and relayed to microprocessor 84, indicates the volume of the gas and therefore the distance between vanes.

The shaft positions can also be followed by magnetic pulse devices that provide a high degree of accuracy.

A further sensor variation is one designed to determine the beginning of the engine cycle. Specifically, two pressure transducers may be mounted in the engine housing, spaced with one on each side of the starting point of the cycle and a cam-actuated electrical breaker point may be located on one of the concentric shafts. The cycle begins when the output signals from the transducers are equal. Simultaneously the leading edge of the vane attached to the concentric shaft should be at the starting point. Any advancement or delay of the vane indicates that the engine is deviating from steady state operation. The timing mechanisms as disclosed above provide effective control over the operation of a type of rotary internal combustion engine that shows considerable promise. Such an engine has advantages of high power output per engine weight, simplicity of design, modest fuel consumption, and high torque. In order to realize these benefits, however, an effective timing mechanism, as disclosed herein, is required.

EXAMPLE 1

A computer run was made to determine the positions of the vanes during an engine cycle. The maximum velocity of the vanes was 21600 degrees per second and the ratchet housing speed was 2160 degrees per second. The weight of each vane was 1 pound and the size of each vane portion was equal to an arc of 20°. The sparkplug was located at 52.5° or the circumference of the housing, and the exhaust and inlet ports at 232.5° and 257.5° respectively. Ignition occurred when the sparkplug was equidistant between the vane edges defining the compressed charge.

Figure 4:
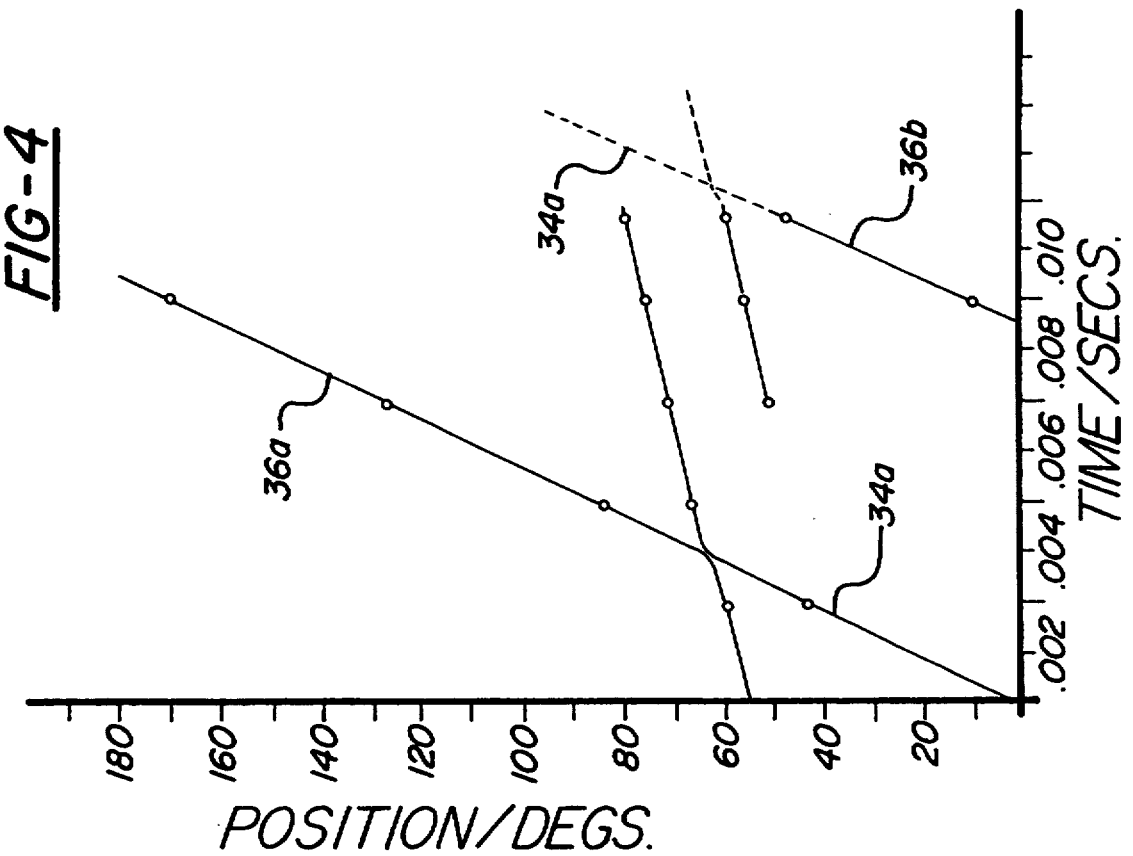
FIG. 4 is a graph of the positions of the vanes during an engine cycle.

The results of the run are plotted in FIG. 4. As is shown, the vanes collide very much like billiard balls in that the momentum of the fastest moving vane is rapidly transferred to the slower one. The beginning of a new cycle is shown by dotted line extensions of the curves.

As indicated by the location of the second collision of the vanes, the engine is not far from steady state operation.

EXAMPLE 2

A series of runs were made with an engine that had the same vanes as the engine in Example 1. The outlet and inlet ports, however, were located at 155° and 205° from the sparkplug respectively. The engine speed was varied to indicate the operation of the engine under steady state conditions. The maximum velocity of the vanes ranged from 5400 degrees per second to 64,800 degrees per second. The corresponding ratchet housing velocities at equilibrium are plotted in FIG. 5. The date approximate a straight line with a slope of 1/8.5. These results corroborate the theoretical analysis outlined above. They also confirm the feasibility of the time mechanism covered by the present invention.

Although preferred embodiments of the invention have been illustrated and described in detail, it will be apparent that various changes may be made in the disclosed embodiments without departing from the scope or spirit of the invention.

I claim:

1. A timing mechanism for a rotary internal combustion engine including a housing, two vanes mounted on concentric shafts for independent rotation in one direction within the housing in response to combustion within the housing, first control means operative to prevent rotation of the vanes within the housing in the other direction, and converter means to convert the movements of the vanes into unidirectional rotation of an output shaft, said timing mechanism comprising:

rotation means operative to rotate the vanes relative to each other independently of the combustion induced rotation of the vanes within the housing;

sensor means operative to generate an output signal indicative of the relative positions of the vanes at any given time in the engine cycle; and second control means receiving the output signal from the sensor means and operative to control the rotation means in accordance with the received output signal.

2. A timing mechanism according to claim 1 wherein:
the sensor means includes an electrical breaker point actuated by a cam attached to the output shaft.

3. A timing mechanism according to claim 2 wherein:
the sensor means further includes a further electrical breaker point actuated by a cam attached to one of the concentric shafts.

4. A rotary internal combustion engine including a housing, two vanes mounted on concentric shafts for independent rotation in one direction within the housing in response to combustion within the housing, means operative to prevent rotation of the vanes within the housing in the other direction, and converter means to convert the movement of the vanes into unidirectional rotation of an output shaft, characterized in that:

the engine further includes rotation means operative to rotate the vanes relative to each other independently of the combustion induced rotation of the vanes within the housing.

5. An engine according to claim 4 wherein the engine further includes:

sensor means operative to generate an output signal indicative of the relative position of the vanes at any given time in the engine cycle; and control means receiving the output signal from the sensor means and operative to control the rotation means in accordance with the received output signal.

6. A timing mechanism for a rotary internal combustion engine including a housing, two vanes mounted on concentric shafts for independent rotation in one direction within the housing in response to combustion within the housing, a ratchet assembly, including a ratchet housing, operative to prevent rotation of the vanes in the other direction, and converter means to convert the movements of the vanes into unidirectional rotation of an output shaft, said timing mechanism comprising:

a motor drivingly connected to the ratchet housing;

sensor means operative to generate an output signal indicative of the relative positions of the vanes at any given time in the engine cycle; and control means receiving the output signal from the sensor means and operative to control the motor in accordance with the received output signal.

7. A timing mechanism for a rotary internal combustion engine including a housing, two vanes mounted on concentric shafts for independent rotation in one direction within the housing in response to combustion within the housing, first control means operative to prevent rotation of the vanes within the housing in the other direction, converter means to convert the movements of the vanes into unidirectional rotation of an output shaft, and rotation means operative to rotate the vanes relative to the housing independently of the combustion induced rotation of the vanes within the housing; characterized in that:

the first control means includes a ratchet assembly including a ratchet housing;

the rotation means includes an epicylic gear train including a drive shaft, a sun gear, a planet carrier and a ring gear;

the drive shaft is centrally located on the axis of the engine, connected at one end to the output shaft of the engine, and connected at its other end to the sun gear;

the planet carrier is drivingly connected to the ratchet housing; and the timing mechanism further includes sensor means operative to generate an output signal indicative of the relative positions of the vanes at any given time in the engine cycle, second control means receiving the output signal from the sensor means and operative to control the rotation means in accordance with the received output signal, and a motor controlled by said second control means and drivingly connected to the ring gear.

8. A timing mechanism for a rotary internal combustion engine including a housing, two vanes mounted on concentric shafts for independent rotation in one direction within the housing in response to combustion within the housing, first control means operative to prevent rotation of the vanes within the housing in the other direction, and converter means to convert the movements of the vanes into unidirectional rotation of an output shaft, said timing mechanism comprising:

rotation means operative to rotate the vanes relative to the housing independently of the combustion induced rotation of the vanes within the housing;

sensor means operative to generate an output signal indicative of the relative positions of the vanes at any given time in the engine cycle; and second control means receiving the output signal from the sensor means and operative to control the rotation means in accordance with the received output signal;

the sensor means comprising a pressure transducer mounted in the engine housing and operative to sense the pressure of the gas between the two vanes.

9. A rotary internal combustion engine including a housing, two vanes mounted on concentric shafts for independent rotation in one direction within the housing in response to combustion within the housing, means operative to prevent rotation of the vanes within the housing in the other direction, and converter means to convert the movement of the vanes into unidirectional rotation of an output shaft, characterized in that:

the engine further includes rotation means operative to rotate the vanes relative to the housing independently of the combustion induced rotation of the vanes within the housing, sensor means operative to generate an output signal indicative of the relative position of the vanes at any given time in the engine cycle, and control means receiving the output signal from the sensor means and operative to control the rotation means in accordance with the received output signal;

the means operative to prevent rotation includes a ratchet assembly including a ratchet housing; and the rotation means includes a motor controlled by said control means and drivingly connected to the ratchet housing.

* * * * *